United States Patent
Miller et al.

(10) Patent No.: US 7,653,833 B1
(45) Date of Patent: Jan. 26, 2010

(54) TERMINATING A NON-CLUSTERED WORKLOAD IN RESPONSE TO A FAILURE OF A SYSTEM WITH A CLUSTERED WORKLOAD

(75) Inventors: Troy Don Miller, Richardson, TX (US); Isom Lawrence Crawford, Jr., Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 350 days.

(21) Appl. No.: 11/590,321

(22) Filed: Oct. 31, 2006

(51) Int. Cl.
*G06F 11/00* (2006.01)
(52) U.S. Cl. ............................. 714/13; 718/1
(58) Field of Classification Search ........................ None
See application file for complete search history.

(56) References Cited

U.S. PATENT DOCUMENTS

| 7,061,923 | B2 | 6/2006 | Dugan et al. | |
|---|---|---|---|---|
| 7,107,495 | B2 | 9/2006 | Kitamorn et al. | |
| 7,111,205 | B1 | 9/2006 | Jahn et al. | |
| 7,168,001 | B2* | 1/2007 | Johnson et al. | 714/13 |
| 2005/0187891 | A1* | 8/2005 | Johnson et al. | 707/1 |
| 2005/0256826 | A1* | 11/2005 | Hambrick et al. | 707/1 |
| 2006/0155912 | A1* | 7/2006 | Singh et al. | 711/6 |
| 2007/0250838 | A1* | 10/2007 | Belady et al. | 718/105 |
| 2008/0184229 | A1* | 7/2008 | Rosu et al. | 718/1 |

* cited by examiner

*Primary Examiner*—Christopher S McCarthy

(57) ABSTRACT

The present invention provides for check-pointing an non-clustered workload to make room for a clustered workload that was running on a computer system that has suffered a hardware failure.

8 Claims, 3 Drawing Sheets

TERMINATING A NON-CLUSTERED WORKLOAD IN RESPONSE TO A FAILURE OF A SYSTEM WITH A CLUSTERED WORKLOAD

BACKGROUND OF THE INVENTION

Herein, related art may be discussed to put the invention in context. Related art labeled "prior art" is admitted prior art; related art not labeled "prior art" is not admitted prior art.

In a high-availability computer system, upon failure of a clustered partition, its workload is typically transferred to another partition in that cluster. However, as the destination partition may already be running its own workload, the migration can result in adequate resources for the combination of the old and the migrated workload. To avoid this, each partition in a cluster can have sufficient resources to run an extra workload, but this type of over-provisioning can be expensive. The present invention provides for a more effective reallocation of resources in response to a failure of a clustered system. This provides an economic advantage since fewer spare resources are required to handle a system failure.

BRIEF DESCRIPTION OF THE DRAWINGS

The following drawings are of embodiments/implementations of the invention and not of the invention itself.

DETAILED DESCRIPTION

Figure 1:
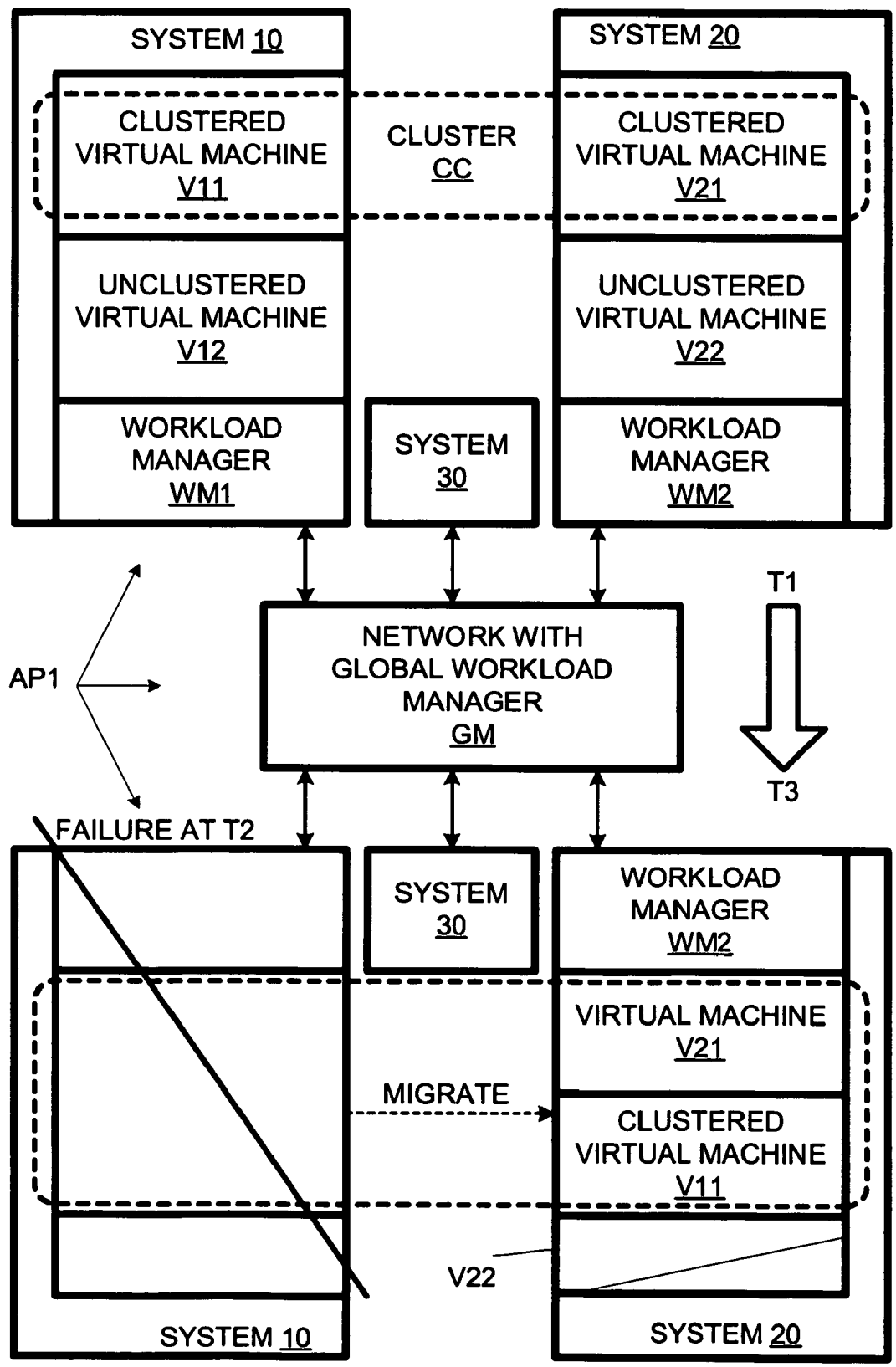
FIG. 1 is a block diagram of a network of clustered computer systems in accordance with an embodiment of the invention. The computer systems are shown both before (at time T1) and after (at time T3) a failure of one of the systems at time T2.
Figure 2:
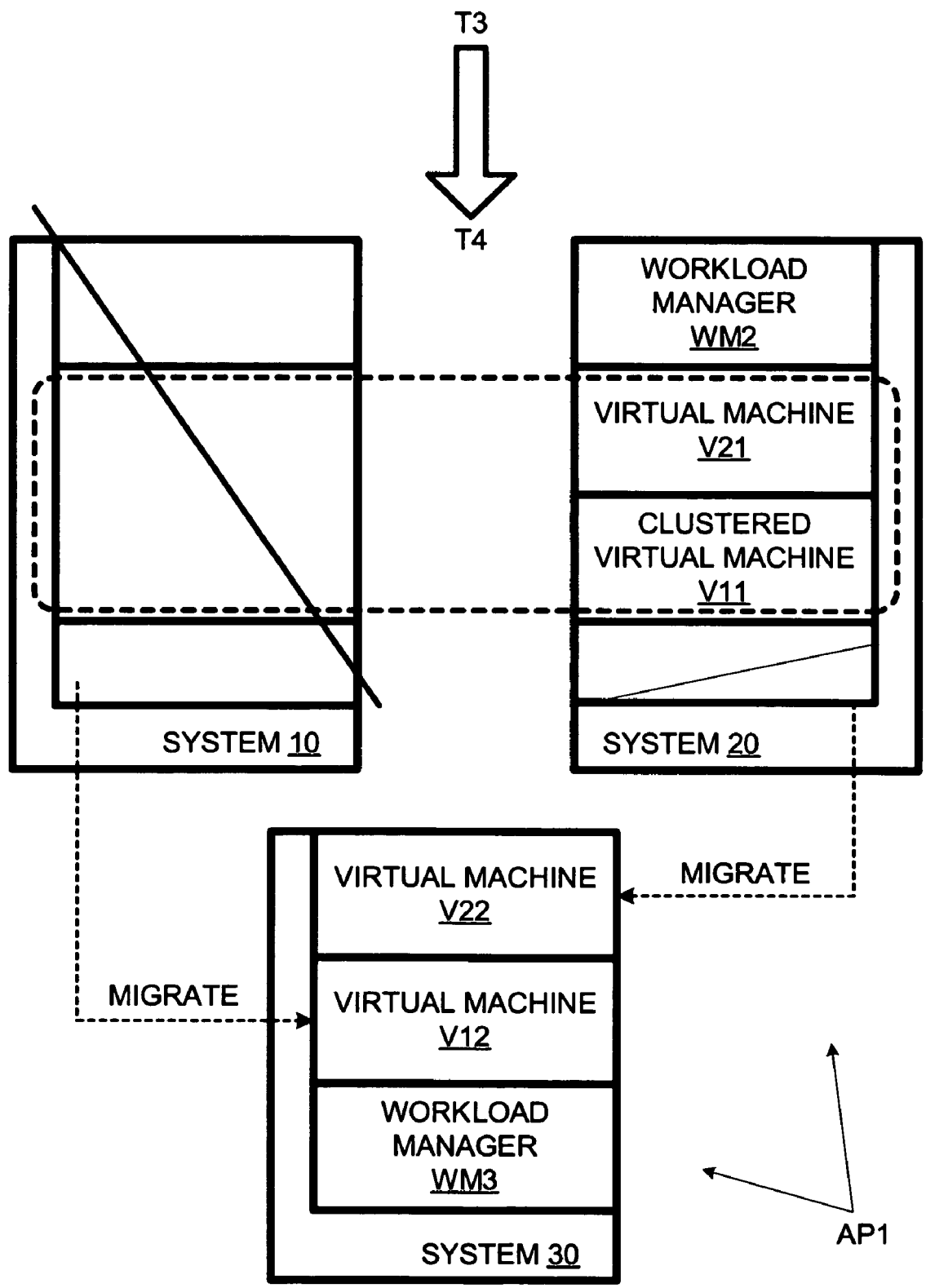
FIG. 2 is a block diagram of the network of FIG. 1 at a time T4.

FIGS. 1 and 2 depict a network AP1 having clustered computer systems 10 and 20 and an unclustered computer system 30. The remainder of network AP1 includes a global workload manager GM, which can be a management workstation. Computer systems 10 and 20 are shown at the top of FIG. 1 in respective configurations at a pre-failure time T1 prior to a failure at a time T2. Computer systems 10 and 20 are shown at the bottom of FIG. 1 in respective configurations at a post-failure time T3.

At pre-failure time T1, system 10 is configured so that it is running a workload manager WM1 and two virtual machines V11 and V12. Also at pre-failure time T2, system 20 is configured so that it is running a workload manager WM2, and virtual machines V21 and V22. Systems 10 and 20 are clustered so that virtual machines V11 and V21 are in a common cluster CC. Virtual machines V12 and V22 are not in clusters. Herein, each virtual machine defines a respective partition.

As used herein and applied to computing resources (processors, memory, etc.), the term "clustered" describes an arrangement of partitions from different computer systems in which a workload from a failed clustered partition can be migrated to another partition in the cluster for high-availability applications. As applied to a virtual machine, the term "clustered" denotes that resources other than those it is currently utilizing are available to run it if the resources it is using fail. Typically, the resources are on another computing system. Thus, if system 10 fails, clustered virtual machine V11 can be migrated to run on system 20, while unclustered virtual machine V12 will simply stop operating.

When a failure occurs, a clustered virtual machine can be moved or "migrated" from one system to another. Typically, this involves activating a previously inactive instance of a virtual machine on the resource computing system and then directing the recently activated instance to the data, e.g., on an external disk array that was being processed by the original instance of the virtual machine.

However, the unutilized resources on a system to which a virtual machine is being migrated may not match those available pre-failure to the original instance of the virtual machine. Typically, virtual machines are clustered because there is a need for them to be highly available. Running them on reduced resources is likely to compromise this availability. Accordingly, the present invention provides for reallocating resources from non-clustered virtual machines on a destination system to clustered virtual machines that are being migrated. This is explained further in connection with the description of method ME1.

Figure 3:
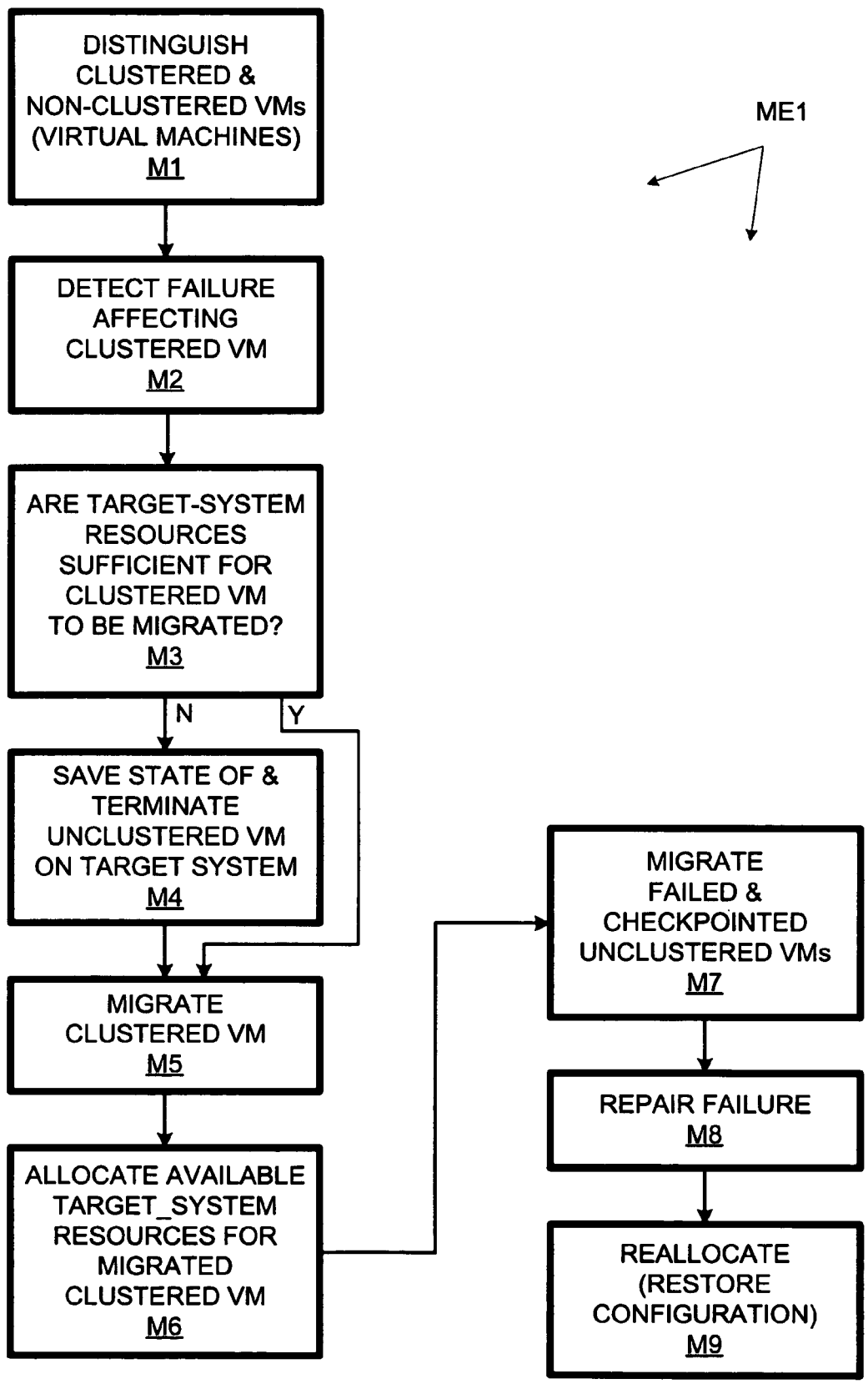
FIG. 3 is a flow chart of a method in accordance with an embodiment of the invention practicable in the context of the system of FIG. 1.

A global workload manager GM implements the following method ME1 in accordance with an embodiment of the invention, as flow-charted in FIG. 3. At method segment M1, global workload manager GM characterizes virtual machines, e.g., V11-V22, classifying them either as either "clustered" or as "non-clustered". Thus, in the pre-failure configuration shown in FIG. 1, virtual machines V11 and V21 are "clustered", while virtual machines V12 and V22 are "unclustered".

At time T2, system 10 fails. The failure is detected shortly after by global workload manager GM at method segment M2. At method segment M3, global workload manager GM determines if the resources available on system 20 are sufficient to run clustered virtual machine V11. If the resources are insufficient, then steps are taken before virtual machine V11 migrates to system 20. Unclustered virtual machine V22 is "checkpointed" at method segment M4. In other words, its state is saved and its operation is terminated at method segment M4.

At method segment M5, virtual machine V11 is migrated to system 20; i.e., a backup instance of virtual machine V11 is launched on system 20. Finally, resources are allocated to virtual machine V11 at method segment M6. Since virtual machine V22 has been terminated, this includes reallocating resources formerly applied to virtual machine V22 to the migrated instance of virtual machine V11. This is the configuration indicated at the lower portion of FIG. 1.

Method ME1 provides for resuming operation of the unclustered virtual machines. At method segment M1, clusters are defined, effectively distinguishing between clustered virtual machines and unclustered virtual machines. At method segment M2, a failure affecting a clustered virtual machine V11 is detected. In accordance with its clustered status, the impacted virtual machine is to be migrated to a target system 20.

At method segment M3, a determination is made whether or not the available resources on the target system 20 are sufficient to meet the management objectives for the migrating virtual machines. If at method segment M3, it is determined the sources on target system 20 are insufficient for the migrating virtual machine, an unclustered virtual machine V22 running on the target system is checkpointed. Then, the migration of the clustered virtual machine V11 is effected at method segment M5.

If at method segment M3 it is determined there are sufficient resources on system 20 for running virtual machine V11 without terminating an unclustered virtual machine on the target system, method segment M4 is skipped. Virtual machine V22 is allowed to continue running. Virtual machine V11 is migrated to system 20 at method segment M5. The necessary available resources are allocated to virtual machine V11 at method segment M6. Only virtual machine V11 will be migrated to system 30 at method segment M7.

At method segment M7, global workload manager GM migrates unclustered virtual machines to system 30, as indicated in FIG. 2. Since workload V22 was checkpointed, it can resume operation from the checkpointed state. Workload V11 may be able to resume operation, but with some loss of data. Of course, in alternative instances of method ME1, either or both unclustered workloads might not be migrated. Instead, they can wait for repair for resumption.

Method segment M7 can also provide for migrating, as indicated in FIG. 2, unclustered virtual machine V12 that was running on failed system 10. By periodically checkpointing unclustered virtual machines, a failed unclustered virtual machine can resume operation from the last checkpointed state.

At method segment M8, system 10 can be repaired. The repair can involve replacement with the same or upgraded or other spare parts. Since the hardware has changed since time T3 and T4, the previous configuration is presumably no longer optimal. Accordingly, a reallocation of resources can be implemented at method segment M9. In some cases, this will result in a return to the configuration of time T1 (top of FIG. 1). However, hardware changes or changes in workload priorities may result in a different configuration of workloads. Alternatively, the repair need not be followed immediately by a reconfiguration.

The invention provides for many alternatives to the illustrated embodiment. Clusters can be formed between partitions of a single computer system (defined by a common housing), or between separate systems, which may be collocated or remotely located relative to each other. Any number of systems or partitions can be involved in a cluster, and a system can be involved in any number of clusters. Virtual machines are typically assigned to single clusters, although the assignment to plural clusters is provided for. Any number of virtual machines can be assigned to a cluster; one or more virtual machines on a system can be assigned to the same cluster. These and other modification to and variations upon the illustrated embodiment are provided for by the present invention, the scope of which is defined by the following claims.

What is claimed is:

1. An automated method comprising:
   clustering first and second workloads, said first and second workloads being on respective first and second computer systems;
   characterizing a third workload as non-clustered, said third workload being on said second computer system;
   detecting a system failure on said first computer system;
   determining whether said second computer system has sufficient resources to allow the clustered workload running on said first computer system to migrate to the second computer system;
   if said resources are not sufficient,
      check-pointing said non-clustered workload on said second computer system at a checkpoint state, and
      migrating said workload from said first computer system to said second computer system.

2. A method as recited in claim 1 wherein, if said resources are sufficient, migrating said first clustered workload to said second computer system without check-pointing said non-clustered workload.

3. A method as recited in claim 1 further comprising, after checkpointing said non-clustered workload, migrating it to a third computer system and resuming its operation from said checkpoint state.

4. A method as recited in claim 3 further comprising, after said detecting said failure, migrating a nonclustered workload that was running on first computer system before said failure to said third computer system.

5. A method as recited in claim 1 further comprising, after repairing said first computer system, returning said first computer workload to said first computer system.

6. A clustered computer network comprising:
   a first computer system;
   a second computer system;
   first, second, and third workloads, said first workload running on said first computer system, said second and third workloads running on said second computer system; and
   a workload manager, said workload manager assigning said first and second workloads to a common cluster and said third workload to no cluster so that, in the event said first system fails, said third workload is check-pointed and said first workload is migrated to said second computer system.

7. A clustered computer network as recited in claim 6 wherein said workload manager migrates said third workload to a third computer system after said third workload is check-pointed so that it resumes operation from its check-pointed state.

8. A clustered computer network as recited in claim 7 wherein, after said first computer system is repaired, said workload manager restores said workload so that it runs on said first computer system.

\* \* \* \* \*